(12) United States Patent
Igarashi

(10) Patent No.: US 8,315,774 B2
(45) Date of Patent: Nov. 20, 2012

(54) VEHICLE DRIVING-FORCE CONTROL DEVICE

(75) Inventor: Masato Igarashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 270 days.

(21) Appl. No.: 12/777,709

(22) Filed: May 11, 2010

(65) Prior Publication Data

US 2010/0299019 A1  Nov. 25, 2010

(30) Foreign Application Priority Data

May 19, 2009 (JP) ................................. 2009-121340

(51) Int. Cl.
*B60T 8/72* (2006.01)

(52) U.S. Cl. ......................................................... 701/80

(58) Field of Classification Search .............. 701/70–71, 701/80–82
See application file for complete search history.

(56) References Cited

U.S. PATENT DOCUMENTS

| 5,826,209 | A | 10/1998 | Matsuno | |
|---|---|---|---|---|
| 6,131,054 | A | 10/2000 | Shibahata | |
| 7,702,442 | B2 | 4/2010 | Takenaka | |
| 7,979,190 | B2 * | 7/2011 | Ohmori et al. | 701/70 |
| 8,055,424 | B2 * | 11/2011 | Salman et al. | 701/80 |
| 2005/0049761 | A1 * | 3/2005 | Kataoka et al. | 701/1 |
| 2007/0027606 | A1 * | 2/2007 | Fodor et al. | 701/82 |
| 2008/0133066 | A1 | 6/2008 | Takenaka | |
| 2008/0201051 | A1 * | 8/2008 | Yoneda et al. | 701/88 |
| 2008/0221769 | A1 | 9/2008 | Matsuno | |
| 2009/0018739 | A1 * | 1/2009 | Ohmori et al. | 701/70 |

FOREIGN PATENT DOCUMENTS

| JP | 10-310042 | 11/1998 |
|---|---|---|
| JP | 2008-232080 | 10/2008 |

* cited by examiner

*Primary Examiner* — Hussein A. Elchanti

(57) ABSTRACT

Friction-circle limit values of wheels are calculated, requested resultant tire forces and resultant tire forces of the wheels are calculated, requested excessive tire forces and excessive tire forces of the wheels are calculated, an over-torque is calculated, and a control amount is calculated. With reference to a preset map, the minimum driving force is set on the basis of a road-surface slope and a requested engine torque, and the minimum driving torque serving as a lower limit is calculated on the basis of the minimum driving force and a total gear ratio of a vehicle so as to perform lower-limit correction of the control amount.

12 Claims, 10 Drawing Sheets

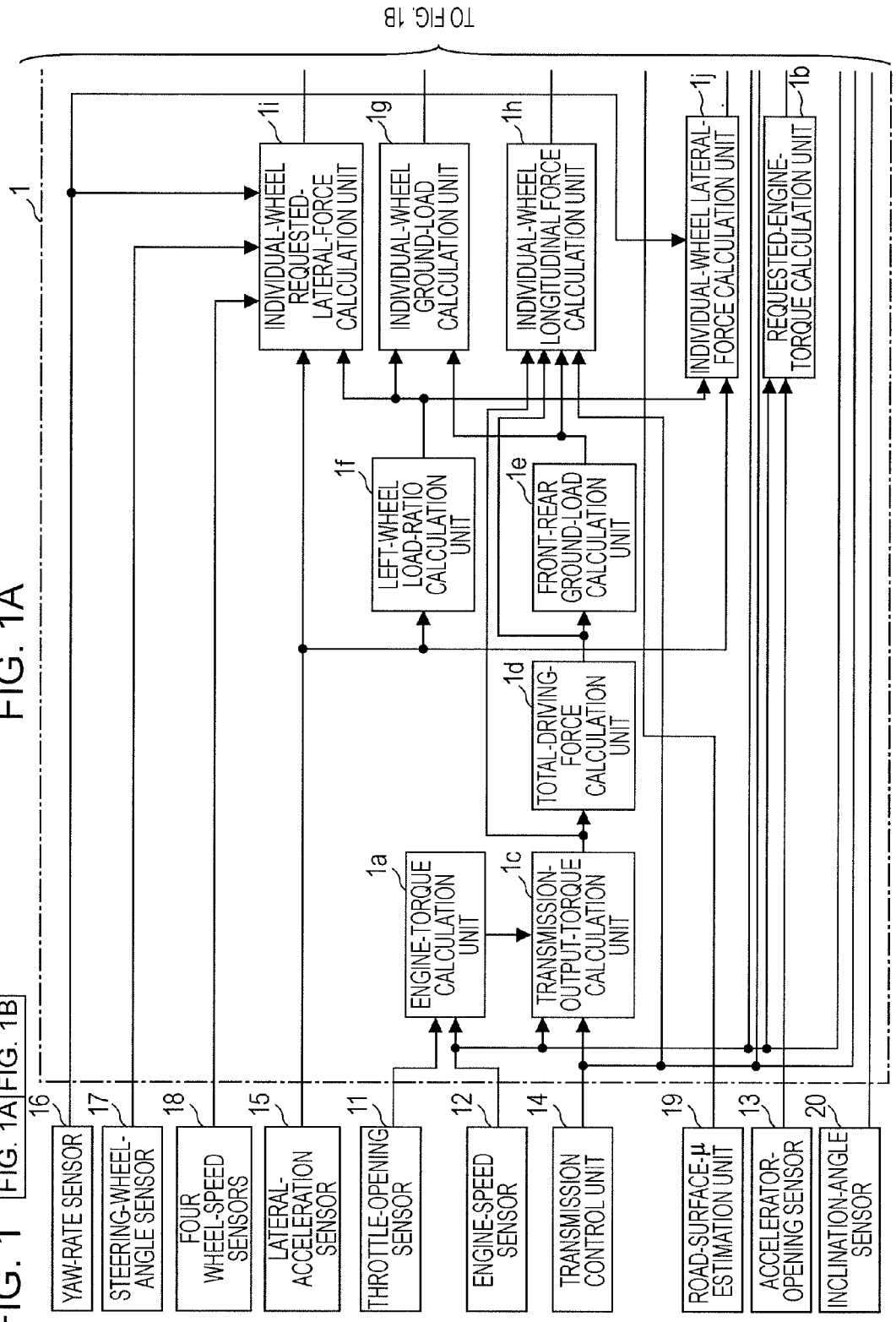

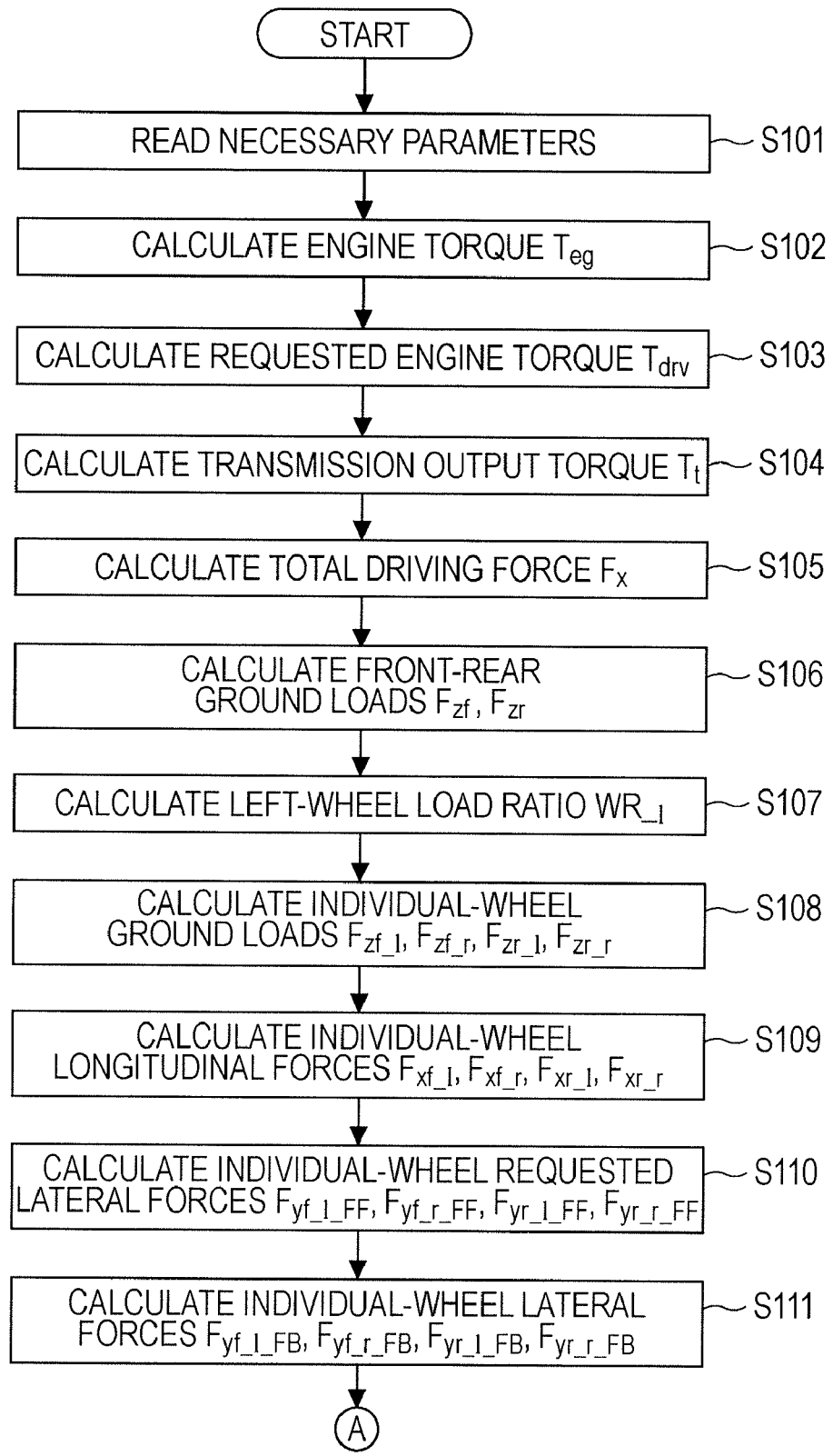

VEHICLE DRIVING-FORCE CONTROL DEVICE

CROSS-REFERENCE TO RELATED APPLICATIONS

The present application claims priority from Japanese Patent Application No. 2009-121340 filed on May 19, 2009, and is hereby incorporated by reference in its entirety.

BACKGROUND OF THE INVENTION

1. Field of the Invention

The present invention relates to a vehicle driving-force control device that controls the driving force so as to properly maintain grip forces of wheels.

2. Description of the Related Art

In recent years, various types of vehicle driving-force control devices that suppress an excessive driving force to maintain grip forces of vehicle wheels have been developed and put to practical use.

For example, in a vehicle driving-force control device disclosed in Japanese Unexamined Patent Application Publication No. 2008-232080 (hereinafter referred to as Patent Document 1), friction-circle limit values of the wheels are calculated, requested resultant tire forces and resultant tire forces of the wheels are calculated, requested excessive tire forces and excessive tire forces of the wheels are calculated, an over-torque is calculated, and a control amount is calculated. This control amount is subjected to lower-limit correction using a first lower limit based on a road surface slope. If the first lower limit cannot be set because the road-surface slope cannot be obtained, lower-limit correction is performed using a second lower limit based on an accelerator opening. In this case, it is possible to inhibit not only an excessive driving force generated in the present, but also an excessive driving force to be presumably generated in the future and to properly maintain the grip forces of tires without interfering with uphill driving on a slope or the like.

However, in the driving-force control device disclosed in Patent Document 1, when the first lower limit is set on the basis of the road-surface slope, driving torque requested by the driver is not considered. Hence, even when the driver feels a necessity for a large driving torque, the lower limit is set at a small value based on the road-surface slope, and this may cause the driver to feel discomfort. In contrast, when the first lower limit based on the road-surface slope is not set, but the second lower limit is set on the basis of the accelerator opening (driving torque), the second lower limit is simply set in accordance with the accelerator opening. Hence, if the main transmission gear ratio is changed, the driving force changes even if the driving torque serving as the second lower limit is fixed. For this reason, the driving force becomes too small or too large, and this may also cause the driver to feel discomfort and may deteriorate driving feeling. Moreover, when the relationship between the accelerator opening and the driving torque for the second lower limit differs, a characteristic view showing the relationship between the accelerator opening and the driving torque needs to be set for each relationship, that is, a characteristic view needs to be set for each vehicle and for each relationship between the accelerator opening and the driving torque in the vehicle.

SUMMARY OF THE INVENTION

Accordingly, it is an object of the present invention to provide a vehicle driving-force control device that properly considers a driving torque requested by a driver, that does not interfere with uphill driving on a slope or the like, that can be easily adopted even when an acceleration-engine torque characteristic differs, that can be properly operated with a same operation feeling, that inhibits not only a currently generated excessive driving force, but also an excessive driving force presumably to be generated in the future, that properly maintains the grip forces of tires, and that improves driving stability of the vehicle.

A vehicle driving-force control device according to an aspect of the present invention includes first-tire-force estimation means configured to estimate, as a first tire force, a tire force to be generated on a wheel of a vehicle on the basis of a request from a driver; second-tire-force estimation means configured to estimate a tire force currently being generated on the wheel as a second tire force; friction-circle limit-value setting means configured to set a friction-circle limit value of a tire force; first-excessive-tire-force estimation means configured to estimate, as a first excessive tire force, a tire force exceeding the friction-circle limit value, on the basis of the first tire force and the friction-circle limit value; second-excessive-tire-force estimation means configured to estimate, as a second excessive tire force, a tire force exceeding the friction-circle limit value on the basis of the second tire force and the friction-circle limit value; control-amount setting means configured to set a control amount for at least one of a driving force and a driving torque for driving the vehicle on the basis of the first excessive tire force and the second excessive tire force; road-surface-slope detection means configured to detect a road surface slope of a driving road; driver-requested engine-torque calculation means configured to calculate an engine torque requested by the driver as a driver-requested engine torque; and control-amount correction means configured to set a lower limit of the control amount on the basis of the road surface slope of the driving road and the driver-requested engine torque so as to perform lower-limit correction of the control amount.

According to the vehicle driving-force control device of the present invention, the driving torque requested by the driver is properly considered, uphill driving on a slope or the like is not interfered, the device can be easily adopted even when the acceleration-engine torque characteristic differs, and the device can be properly operated with a same operating feeling. Moreover, not only a currently generated excessive driving force, but also an excessive driving force presumably to be generated in the future is inhibited, the grip forces of the tires are properly maintained, and driving stability of the vehicle is improved.

BRIEF DESCRIPTION OF THE DRAWINGS

FIG. 2 is a flowchart showing a driving-force control program of the embodiment;

DESCRIPTION OF THE PREFERRED EMBODIMENTS

An embodiment of the present invention will be described below with reference to the drawings. In this embodiment, for example, a vehicle is a four-wheel-drive vehicle equipped with a center differential, in which a limited-slip differential clutch (tightening torque $T_{LSD}$) allows a longitudinal driving-force distribution to be adjustable on the basis of a base torque distribution Rf_cd of the center differential.

Figure 1B:
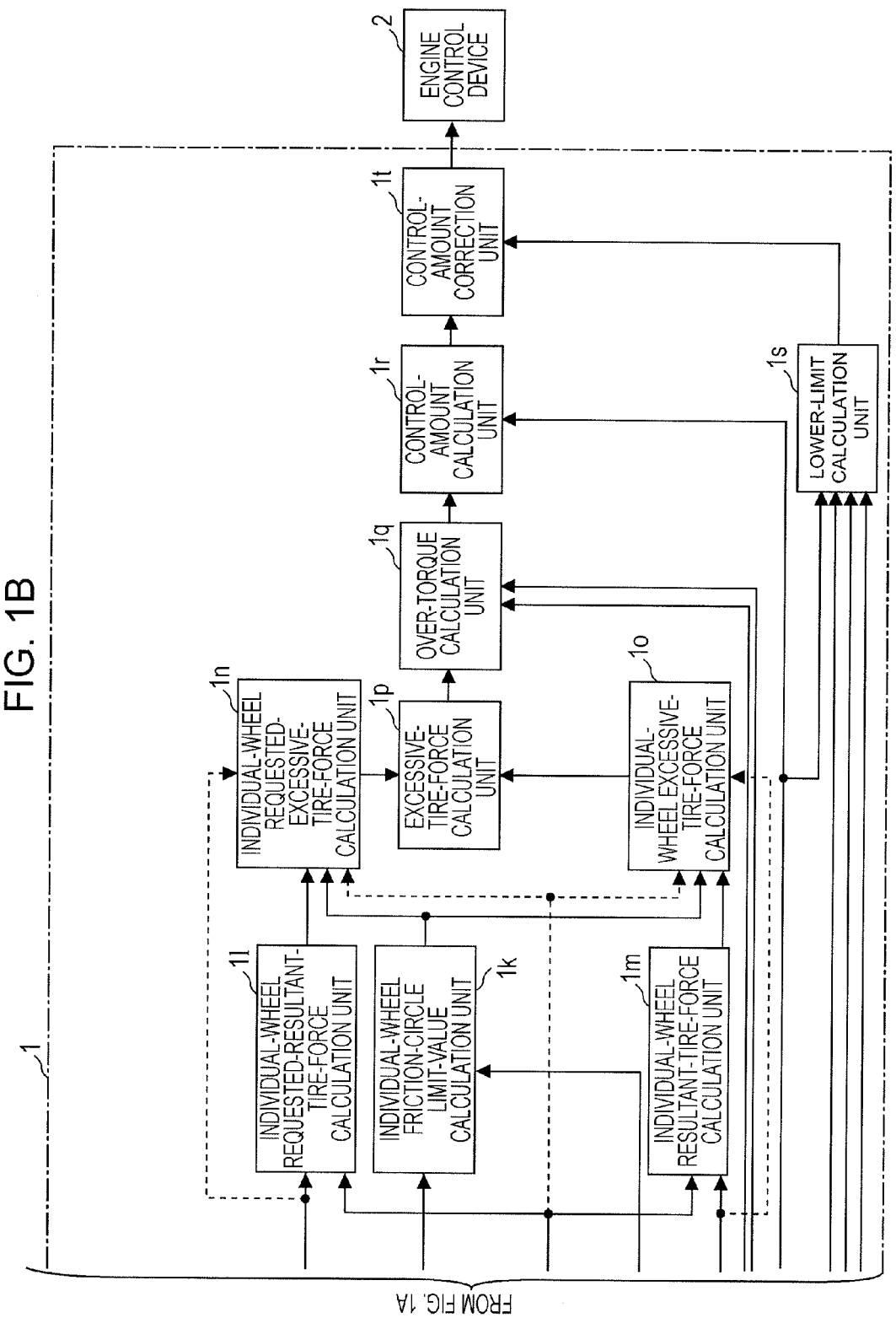
FIGS. 1 (1A and 1B) is a functional block diagram of a driving-force control device according to an embodiment of the present invention.

Referring to FIG. 1, a vehicle driving-force control device 1 is installed in a vehicle so as to properly control the driving force. The driving-force control device 1 is connected to a throttle-opening sensor 11, an engine-speed sensor 12, an accelerator-opening sensor 13, a transmission control unit 14, a lateral-acceleration sensor 15, a yaw-rate sensor 16, a steering-wheel-angle sensor 17, wheel-speed sensors 18 for individual wheels, a road-surface-μ estimation unit 19 and an inclination-angle sensor 20 serving as road-surface-slope detection means. Thus, the driving-force control device 1 receives a throttle opening $\theta_{th}$, an engine speed $N_e$, an accelerator opening $\theta_{ACC}$, a main transmission gear ratio i, a turbine speed $N_t$ of a torque converter, a tightening torque $T_{LSD}$ of a limited-slip differential clutch, a lateral acceleration ($d^2y/dt^2$), a yaw rate γ, a steering-wheel angle $\theta_H$, wheel speeds $\omega_{fl}$, $\omega_{fr}$, $\omega_{rl}$ and $\omega_{rr}$ of the individual wheels (subscripts fl, fr, rl and rr indicate a front left wheel, a front right wheel, a rear left wheel and a rear right wheel respectively), a road-surface friction coefficient μ and a road-surface slope $\theta_{SL}$.

According to these input signals, the driving-force control device 1 calculates an appropriate driving force according to a driving-force control program, which will be described below, and outputs the calculated driving force to an engine control device 2. The engine control device 2 outputs a control signal to a throttle control unit (not shown) so as to drive a motor and to actuate a throttle valve.

Referring to FIG. 1, the driving-force control device 1 mainly includes an engine-torque calculation unit 1a, a requested-engine-torque calculation unit 1b, a transmission-output-torque calculation unit 1c, a total-driving-force calculation unit 1d, a front-rear ground-load calculation unit 1e, a left-wheel load-ratio calculation unit 1f, an individual-wheel ground-load calculation unit 1g, an individual-wheel longitudinal-force calculation unit 1h, an individual-wheel requested-lateral-force calculation unit 1i, an individual-wheel lateral-force calculation unit 1j, an individual-wheel friction-circle limit-value calculation unit 1k, an individual-wheel requested-resultant-tire-force calculation unit 1l, an individual-wheel resultant-tire-force calculation unit 1m, an individual-wheel requested-excessive-tire-force calculation unit 1n, an individual-wheel excessive-tire-force calculation unit 1o, an excessive-tire-force calculation unit 1p, an over-torque calculation unit 1q, a control-amount calculation unit 1r, a lower-limit calculation unit 1s and a control-amount correction unit 1t.

The engine-torque calculation unit 1a receives a throttle opening $\theta_{th}$ from the throttle-opening sensor 11 and an engine speed $N_e$ from the engine-speed sensor 12. With reference to a map (e.g., a map shown in FIG. 4) preset in accordance with the engine characteristics, the engine-torque calculation unit 1a finds a currently generated engine torque $T_{eg}$, and outputs the engine torque $T_{eg}$ to the transmission-output-torque calculation unit 1c. The engine torque $T_{eg}$ may be read from the engine control device 2.

The requested-engine-torque calculation unit 1b receives an accelerator opening $\theta_{ACC}$ from the accelerator-opening sensor 13 and the engine speed $N_e$ from the engine-speed sensor 12. With reference to a preset map (e.g., a map shown in FIG. 5 indicating the relationship between $\theta_{ACC}$ and $\theta_{th}$), the required-engine-torque calculation unit 1b finds a throttle opening $\theta_{th}$, finds an engine torque $T_{eg}$ from the map shown in FIG. 4 on the basis of the throttle opening $\theta_{th}$, and outputs the engine torque $T_{eg}$ as a requested engine torque $T_{drv}$ to the control-amount calculation unit 1r and the lower-limit calculation unit 1s. The requested engine torque $T_{drv}$ may be found from a map preset in accordance with the accelerator opening $\theta_{ACC}$, or may be read from the engine control device 2. That is, the requested-engine-torque calculation unit 1b serves as driver-requested engine-torque calculation means.

The transmission-output-torque calculation unit 1c receives the engine speed $N_e$ from the engine-speed sensor 12, a main transmission gear ratio i and a turbine speed $N_t$ of a torque converter from the transmission control unit 14 and the engine torque $T_{eg}$ from the engine-torque calculation unit 1a.

For example, the transmission-output-torque calculation unit 1c calculates a transmission output torque $T_t$ according to the following expression (1), and outputs the transmission output torque $T_t$ to the total-driving-force calculation unit 1d and the individual-wheel longitudinal-force calculation unit 1h:

$$T_t = T_{eg} \cdot t \cdot i \quad (1)$$

where t represents the preset torque ratio of the torque converter, and is found with reference to a preset map indicating the relationship between the rotation speed ratio ($=N_t/N_e$) of the torque converter and the torque ratio of the torque converter.

The total-driving-force calculation unit 1d receives the transmission output torque $T_t$ from the transmission-output-torque calculation unit 1c.

For example, the total-driving-force calculation unit 1d calculates a total driving force $F_x$ according to the following expression (2), and outputs the total driving force $F_x$ to the front-rear ground-load calculation unit 1e and the individual-wheel longitudinal-force calculation unit 1h:

$$F_x = T_t \cdot \eta \cdot i_f / R_t \quad (2)$$

where η represents the driving-system transmission efficiency, $i_f$ represents the final gear ratio, and $R_t$ represents the tire radius.

The front-rear ground-load calculation unit 1e receives the total driving force $F_x$ from the total-driving-force calculation unit 1d. The front-rear ground-load calculation unit 1e calculates a front-wheel ground contact load $F_{zf}$ according to the following expression (3) and outputs the front-wheel ground contact load $F_{zf}$ to the individual-wheel ground-load calculation unit 1g and the individual-wheel longitudinal-force calculation unit 1h, and calculates a rear-wheel ground contact load $F_{zr}$ according to the following expression (4) and outputs the rear-wheel ground contact load $F_{zr}$ to the individual-wheel ground-load calculation unit 1g:

$$F_{zf}=W_f-((m \cdot (d^2x/dt^2) \cdot h)/L) \tag{3}$$

$$F_{zr}=W-F_{zf} \tag{4}$$

where $W_f$ represents the front-wheel static load, m represents the vehicle mass, $(d^2x/dt^2)$ represents the longitudinal acceleration $(=F_x/m)$, h represents the height of the center of gravity, L represents the wheel base, and W represents the vehicle weight $(=m \cdot G$; G is the gravitational acceleration).

The left-wheel load-ratio calculation unit 1f receives a lateral acceleration $(d^2y/dt^2)$ from the lateral-acceleration sensor 15. The left-wheel load-ratio calculation unit 1f calculates a left-wheel load ratio $W_{R\_l}$ according to the following expression (5), and outputs the left-wheel load ratio $W_{R\_l}$ to the individual-wheel ground-load calculation unit 1g, the individual-wheel requested-lateral-force calculation unit 1i and the individual-wheel lateral-force calculation unit 1j:

$$W_{R\_l}=0.5-((d^2y/dt^2)/G) \cdot (h/L_{tred}) \tag{5}$$

where $L_{tred}$ represents the average tread of the front and rear wheels.

The individual-wheel ground-load calculation unit 1g receives the front-wheel ground contact load $F_{zf}$ and the rear-wheel ground contact load $F_{zr}$ from the front-rear ground-load calculation unit 1e and the left-wheel load ratio $W_{R\_l}$ from the left-wheel load-ratio calculation unit 1f. The individual-wheel ground-load calculation unit 1g calculates a front-left-wheel ground contact load $F_{zf\_l}$, a front-right-wheel ground contact load $F_{zf\_r}$, a rear-left-wheel ground contact load $F_{zr\_l}$, and a rear-right-wheel ground contact load $F_{zr\_r}$, respectively, according to the following expressions (6), (7), (8) and (9), and outputs the calculated values to the individual-wheel friction-circle limit-value calculation unit 1k:

$$F_{zf\_l}=F_{zf} \cdot W_{R\_l} \tag{6}$$

$$F_{zf\_r}=F_{zf}(1-W_{R\_l}) \tag{7}$$

$$F_{zr\_l}=F_{zr} \cdot W_{R\_l} \tag{8}$$

$$F_{zr\_r}=F_{zr} \cdot (1-W_{R\_l}) \tag{9}$$

The individual-wheel longitudinal-force calculation unit 1h receives a tightening torque $T_{LSD}$ of the limited-slip differential clutch in the center differential from the transmission control unit 14, the transmission output torque $T_t$ from the transmission-output-torque calculation unit 1c, the total driving force $F_x$ from the total-driving-force calculation unit 1d, and the front-wheel ground contact load $F_{zf}$ from the front-rear ground-load calculation unit 1e. For example, the individual-wheel longitudinal-force calculation unit 1h calculates a front-left-wheel longitudinal force $F_{xf\_l}$, a front-right-wheel longitudinal force $F_{xf\_r}$, a rear-left-wheel longitudinal force $F_{xr\_l}$, and a rear-right-wheel longitudinal force $F_{xr\_r}$ in the following procedure, and outputs the calculated values to the individual-wheel requested-resultant-tire-force calculation unit 1l and the individual-wheel resultant-tire-force calculation unit 1m.

A description will be given below of an example of a procedure for calculating the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$.

First, a front-wheel load distribution rate $W_{R\_f}$ is calculated according to the following expression (10):

$$W_{R\_f}=F_{zf}/W \tag{10}$$

Next, the minimum front-wheel longitudinal torque $T_{fmin}$ and the maximum front-wheel longitudinal torque $T_{fmax}$ are calculated according to the following expressions (11) and (12):

$$T_{fmin}=T_t \cdot R_{f\_cd}-T_{LSD}(\geqq 0) \tag{11}$$

$$T_{fmax}=T_t \cdot R_{f\_cd}+T_{LSD}(\geqq 0) \tag{12}$$

Subsequently, the minimum front-wheel longitudinal force $F_{xfmin}$ and the maximum front-wheel longitudinal force $F_{xfmax}$ are calculated according to the following expressions (13) and (14):

$$F_{xfmin}=T_{fmin} \cdot \eta \cdot if/R_t \tag{13}$$

$$F_{xfmax}=T_{fmax} \cdot \eta \cdot if/R_t \tag{14}$$

Then, a state is determined as follows:

When $W_{R\_f} \leqq F_{xfmin}/F_x$, it is determined that the limited-slip differential torque is increasing at the rear wheels, and a determination value I is set at 1.

When $W_{R\_f} \geqq F_{xfmax}/F_x$, it is determined that the limited-slip differential torque is increasing at the front wheels, and the determination value I is set at 3.

In cases other than the above cases, it is determined that the state is a normal state, and the determination value I is set at 2.

Next, a front-wheel longitudinal force $F_{xf}$ is calculated in accordance with the above determination value I as follows:

When $I=1, F_{xf}=F_{xfmin} \cdot \eta \cdot if/R_t \tag{15}$

When $I=2, F_{xf}=F_x \cdot W_{R\_f} \tag{16}$

When $I=3, F_{xf}=F_{xfmax} \cdot \eta \cdot i_f/R_t \tag{17}$

Then, according to the following expression (18), a rear-wheel longitudinal force $F_{xr}$ is calculated from the front-wheel longitudinal force $F_{xf}$ that is calculated according to the expression (15), (16) or (17):

$$F_{xr}=F_x-F_{xf} \tag{18}$$

Using the above front-wheel longitudinal force $F_{xf}$ and rear-wheel longitudinal force $F_{xr}$, a front-left-wheel longitudinal force $F_{xf\_l}$, a front-right-wheel longitudinal force $F_{xf\_r}$, a rear-left-wheel longitudinal force $F_{xr\_l}$, and a rear-right-wheel longitudinal force $F_{xr\_r}$ are calculated according to the following expressions (19) to (22):

$$F_{xf\_l}=F_{xf}/2 \tag{19}$$

$$F_{xf\_r}=F_{xf\_l} \tag{20}$$

$$F_{xr\_l}=F_{xr}/2 \tag{21}$$

$$F_{xr\_r}=F_{xr\_l} \tag{22}$$

The calculations of the longitudinal forces of the wheels adopted in the embodiment are just exemplary, and can be appropriately selected in accordance with, for example, the driving method or driving mechanism of the vehicle.

The individual-wheel requested-lateral-force calculation unit 1i receives the lateral acceleration $(d^2y/dt^2)$ from the lateral-acceleration sensor 15, a yaw rate γ from the yaw-rate sensor 16, a steering-wheel angle $\theta_H$ from the steering-wheel-angle sensor 17, wheel speeds $\omega_{fl}$, $\omega_{fr}$, $\omega_{rl}$ and $\omega_{rr}$ from the wheel-speed sensors 18 of the four wheels, and the left-wheel load ratio $W_{R\_l}$ from the left-wheel load-ratio calculation unit 1f.

The individual-wheel requested-lateral-force calculation unit 1i calculates an additional yaw moment $M^{z\theta}$ in the following procedure (according to a flowchart shown in FIG. 6), calculates a requested front-wheel lateral force $F_{yf\_FF}$ on the basis of the additional yaw moment $M_{z\theta}$ according to the following expression (23), and calculates a requested rear-wheel lateral force $F_{yr\_FF}$ according to the following expression (24). Further, the individual-wheel requested-lateral-force calculation unit 1i calculates a front-left-wheel requested lateral force $F_{yf\_l\_FF}$, a front-right-wheel requested lateral force $F_{yf\_r\_FF}$, a rear-left-wheel requested lateral force $F_{yr\_l\_FF}$, and a rear-right-wheel requested lateral force $F_{yr\_r\_FF}$ according to the following expressions (25) to (28) on the basis of the requested front-wheel lateral force $F_{yf\_FF}$ and the requested rear-wheel lateral force $F_{yr\_FF}$, and outputs the calculated values to the individual-wheel requested-resultant-tire-force calculation unit 1l:

$$F_{yf\_FF} = M_{z\theta}/L \tag{23}$$

$$F_{yr\_FF} = (-I_z \cdot (d\gamma/dt) + m \cdot (d^2y/dt^2) \cdot L_f)/L \tag{24}$$

where $I_z$ represents the yaw moment of inertia of the vehicle, and $L_f$ represents the distance between the front axle and the center of gravity.

$$F_{yf\_l\_FF} = F_{yf\_FF} \cdot W_{R\_l} \tag{25}$$

$$F_{yf\_r\_FF} = F_{yf\_FF} \cdot (1 - W_{R\_l}) \tag{26}$$

$$F_{yr\_l\_FF} = F_{yr\_FF} \cdot W_{R\_l} \tag{27}$$

$$F_{yr\_r\_FF} = F_{yr\_FF} \cdot (1 - W_{R\_l}) \tag{28}$$

Figure 6:
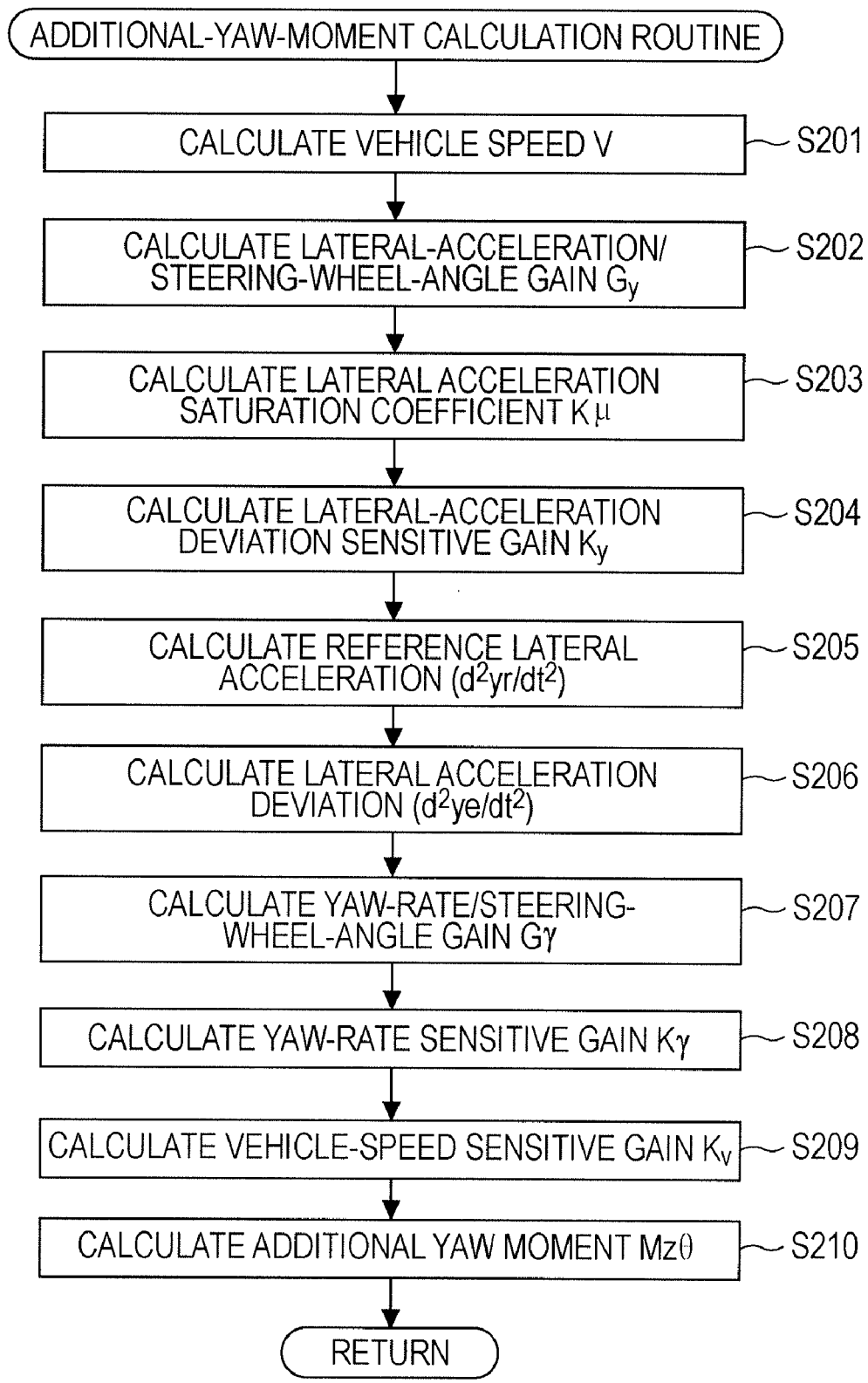
FIG. 6 is a flowchart showing an additional-yaw-moment calculation routine of the embodiment.

The additional yaw moment $M_{z\theta}$ is determined, as shown in FIG. 6. First, a vehicle speed V is calculated in Step (hereinafter abbreviated as S) 201 (e.g., $V = (\omega_{fl} + \omega_{fr} + \omega_{rl} + \omega_{rr})/4$), and a lateral-acceleration/steering-wheel-angle gain $G_y$ is calculated according to the following expression (29) in S202:

$$G_y = (1/(1+A \cdot V^2)) \cdot (V^2/L) \cdot (1/n) \tag{29}$$

where A represents the stability factor, and n represents the steering gear ratio.

Figure 7A:
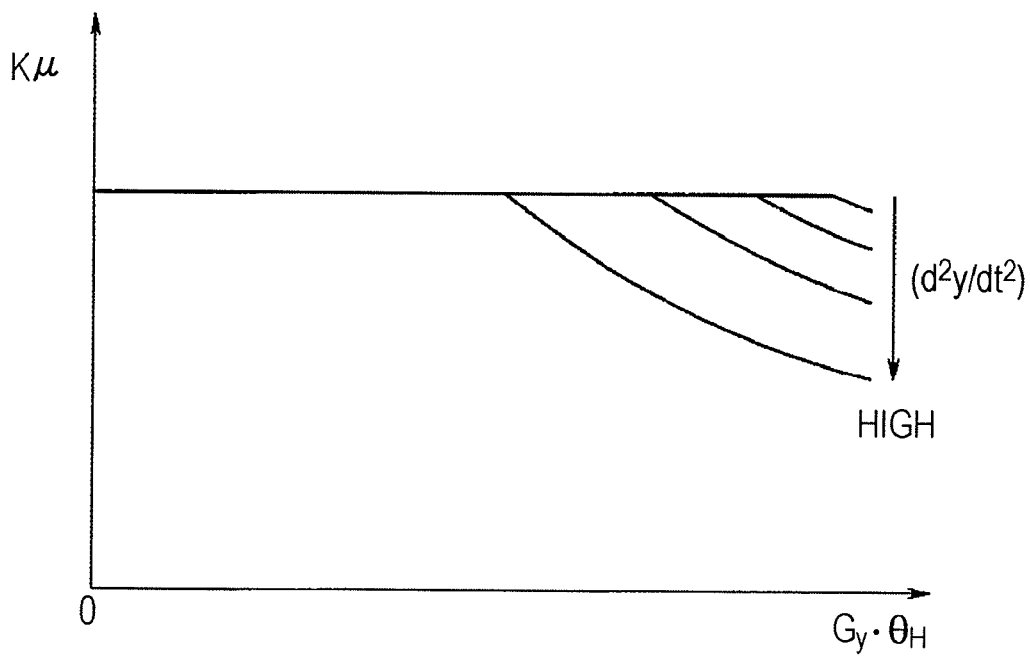
FIGS. 7A and 7B are explanatory views showing a lateral-acceleration saturation coefficient of the embodiment.
Figure 7B:
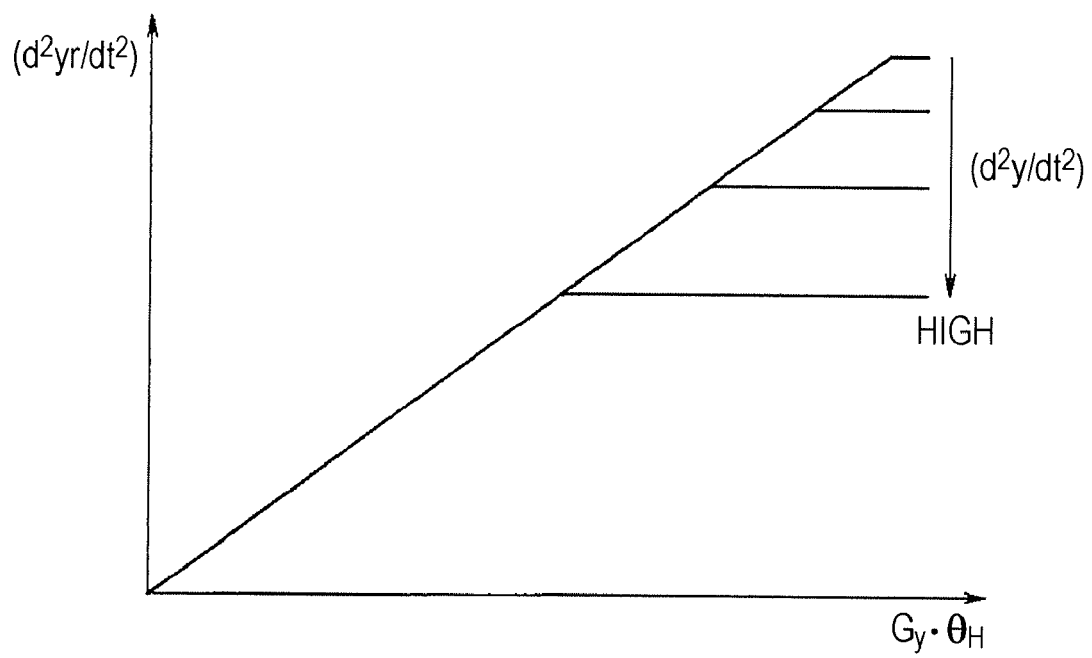

Next, in S203, a lateral-acceleration saturation coefficient $K\mu$ is calculated with reference to a map preset in accordance with the product ($G_y \cdot \theta_H$) of the lateral-acceleration/steering-wheel-angle gain $G_y$ and the steering-wheel angle $\theta_H$ and the lateral acceleration ($d^2y/dt^2$). The map used to find the lateral-acceleration saturation coefficient $K\mu$ is preset in accordance with the product ($G_y \cdot \theta_H$) of the lateral-acceleration/steering-wheel-angle gain $G_y$ and the steering-wheel angle $\theta_H$, and the lateral acceleration ($d^2y/dt^2$), as shown in FIG. 7A. When the steering angle $\theta_H$ is more than or equal to a predetermined value, the lateral-acceleration saturation coefficient $K\mu$ is set to decrease as the lateral acceleration ($d^2y/dt^2$) increases. This means that, when $G_y \cdot \theta_H$ is large, the lateral acceleration ($d^2y/dt^2$) increases as the friction coefficient $\mu$ of the road surface increases, but the lateral acceleration ($d^2y/dt^2$) does not easily occur when the friction coefficient $\mu$ of the road surface is low. Hence, as shown in FIG. 7B, when $G_y \cdot \theta_H$ is large, a reference lateral acceleration ($d^2yr/dt^2$), which will be described below, is set at a low value in a case in which it seems that the lateral acceleration ($d^2y/dt^2$) is high and the road surface has a high friction coefficient $\mu$, so that the correction amount for the additional yaw moment $M_{z\theta}$ is made small.

Next, in S204, a lateral-acceleration deviation sensitive gain $K_y$ is calculated according to the following expression (30):

$$K_y = K_\theta/G_y \tag{30}$$

where $K_\theta$ represents the steering-angle sensitive gain. The steering-angle sensitive gain $K_\theta$ is calculated according to the following expression (31):

$$K_\theta = (L_f K_f)/n \tag{31}$$

where $K_f$ represents the equivalent cornering power of the front axle.

That is, the lateral-acceleration deviation sensitive gain $K_y$ is set as a target value (maximum value) from the above expression (30) in view of a case in which the additional yaw moment $M_{z\theta}$ (steady-state value) is 0 when steering is absolutely ineffective on an extremely low-$\mu$ road ($\gamma = 0$, $(d^2y/dt^2) = 0$).

Next, in S205, a reference lateral acceleration ($d^2yr/dt_2$) is calculated according to the following expression (32):

$$(d^2yr/dt^2) = K_\mu \cdot G_y \cdot (1/(1+T_y s)) \cdot \theta_H \tag{32}$$

where s is a differential operator, and $T_y$ is a first-order-lag time constant of the lateral acceleration. For example, the first-order-lag time constant $T_y$ is calculated according to the following expression (33):

$$T_y = I_z/(L \cdot K_r) \tag{33}$$

where $K_r$ represents the equivalent cornering power of the rear axle.

In S206, a lateral-acceleration deviation ($d^2ye/dt^2$) is calculated according to the following expression (34):

$$(d^2ye/dt^2) = (d^2y/dt^2) - (d^2yr/dt^2) \tag{34}$$

Next, in S207, a yaw-rate/steering-wheel-angle gain $G\gamma$ is calculated according to the following expression (35):

$$G\gamma = (1/(1+A \cdot V^2)) \cdot (V/L) \cdot (1/n) \tag{35}$$

Next, in S208, a yaw-rate sensitive gain $K\gamma$ is calculated according to the following expression (36), for example, in view of a case in which the additional yaw moment $M_{z\theta}$ (steady-state value) becomes zero at the time of grip driving (($d^2ye/dt^2$) = 0):

$$K\gamma = K_\theta/G\gamma \tag{36}$$

Figure 8:
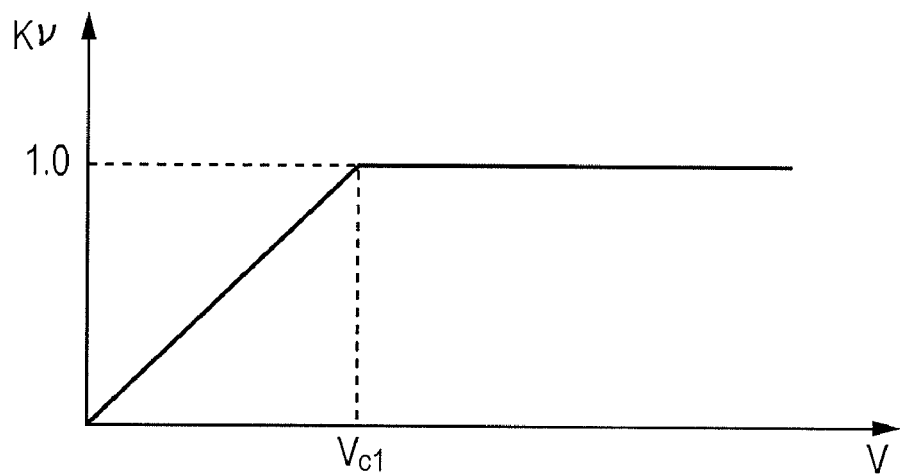
FIG. 8 is a characteristic map showing the vehicle-speed sensitive gain of the embodiment.

Next, in S209, a vehicle-speed sensitive gain $K_v$ is calculated according to a preset map. For example, this map is set to avoid an unnecessary additional yaw moment $M_{z\theta}$ in a low-speed range, as shown in FIG. 8. In FIG. 8, $V_{c1}$ is 40 km/h as an example.

In S210, an additional yaw moment $M_{z\theta}$ is calculated according to the following expression (37):

$$M_{z\theta} = K^v \cdot (-K\gamma \cdot \gamma + K_y \cdot (d^2ye/dt^2) + K^{74} \cdot \theta_H) \tag{37}$$

Figure 9:
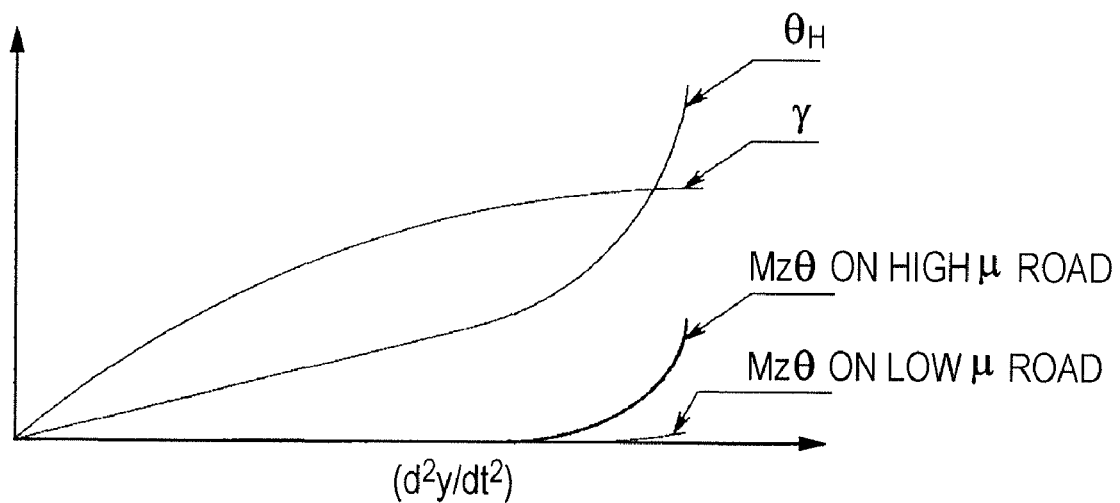
FIG. 9 is an explanatory view showing the difference in additional-yaw moment between a road having a high friction coefficient and a load having a low friction coefficient in the embodiment.

That is, as shown by the expression (37), the term $-K\gamma \cdot \gamma$ represents the yaw moment sensitive to the yaw rate $\gamma$, the term $K_\theta \cdot \theta_H$ represents the yaw moment sensitive to the steering wheel angle $\theta H$, and the term $K_y \cdot (d^2ye/dt^2)$ represents the correction value of the yaw moment. For this reason, as shown in FIG. 9, when the vehicle is driven on a high-$\mu$ road at a high lateral acceleration ($d^2y/dt^2$), the additional yaw moment $M_{z\theta}$ becomes a large value, and this improves the driving performance. In contrast, when the vehicle is driven on a low-$\mu$ road, the additional yaw moment $M_{z\theta}$ is reduced by the action of the above-described correction value. Hence, the steering response does not excessively increase, and a stable driving performance can be obtained.

The individual-wheel lateral-force calculation unit 1*j* receives the lateral acceleration ($d^2y/dt^2$) from the lateral-acceleration sensor 15, the yaw rate γ from the yaw-rate sensor 16, and the left-wheel load ratio $W_{R\_l}$ from the left-wheel load-ratio calculation unit 1*f*. The individual-wheel lateral-force calculation unit 1*j* calculates a front-wheel lateral force $F_{yf\_FB}$ according to the following expression (38), and calculates a rear-wheel lateral force $F_{yr\_FB}$ according to the following expression (39). On the basis of the front-wheel lateral force $F_{yf\_FB}$ and the rear-wheel lateral force $F_{yr\_FB}$, the individual-wheel lateral-force calculation unit 1*j* calculates a front-left-wheel lateral force $F_{yf\_l\_FB}$, a front-right-wheel lateral force $F_{yf\_r\_FB}$, a rear-left-wheel lateral force $F_{yr\_l\_FB}$, and a rear-right-wheel lateral force $F_{yr\_r\_FB}$ according to the following expressions (40) to (43), and outputs the calculated values to the individual-wheel resultant-tire-force calculation unit 1*m*:

$$F_{yf\_FB}=(I_z\cdot(d\gamma/dt)+m\cdot(d^2y/dt^2)\cdot L_r)/L \quad (38)$$

$$F_{yr\_FB}=(-I_z\cdot(d\gamma/dt)+m\cdot(d^2y/dt^2)\cdot L_f)/L \quad (39)$$

where $L_r$ represents the distance between the rear axle and the center of gravity.

$$F_{yf\_l\_FB}=F_{yf\_FB}\cdot W_{R\_l} \quad (40)$$

$$F_{yf\_r\_FB}=F_{yf\_FB}\cdot(1-W_{R\_l}) \quad (41)$$

$$F_{yr\_l\_FB}=F_{yr\_FB}\cdot W_{R\_l} \quad (42)$$

$$F_{yr\_r\_FB}=F_{yr\_FB}\cdot(1-W_{R\_l}) \quad (43)$$

The individual-wheel friction-circle limit-value calculation unit 1*k* receives a road-surface friction coefficient μ from the road-surface-μ estimation unit 19 and the front-left-wheel ground contact load $F_{zf\_l}$, the front-right-wheel ground contact load $F_{zf\_r}$, the rear-left-wheel ground contact load $F_{zr\_l}$, and the rear-right-wheel ground contact load $F_{zr\_r}$ from the individual-wheel ground-load calculation unit 1*g*.

The individual-wheel friction-circle limit-value calculation unit 1*k* calculates a front-left-wheel friction-circle limit value $\mu\_F_{zfl}$, a front-right-wheel friction-circle limit value $\mu\_F_{zfr}$, a rear-left-wheel friction-circle limit value $\mu F_{zrl}$, and a rear-right-wheel friction-circle limit value $\mu\_F_{zrr}$ according to the following expressions (44) to (47), and outputs the calculated values to the individual-wheel requested-excessive-tire-force calculation unit 1*n* and the individual-wheel excessive-tire-force calculation unit 1*o*. That is, the individual-wheel friction-circle limit-value calculation unit 1*k* serves as friction-circle limit-value setting means.

$$\mu\_F_{zfl}=\mu\cdot F_{zf\_l} \quad (44)$$

$$\mu\_F_{zfr}=\mu\cdot F_{zf\_r} \quad (45)$$

$$\mu\_F_{zrl}=\mu\cdot F_{zr\_l} \quad (46)$$

$$\mu\_F_{zrr}=\mu\cdot F_{zr\_r} \quad (47)$$

The individual-wheel requested-resultant-tire-force calculation unit 1*l* receives the front-left-wheel longitudinal force $F_{xf\_l}$, the front-right-wheel longitudinal force $F_{xf\_r}$, the left-rear-wheel longitudinal force $F_{xr\_l}$, and the rear-right-wheel longitudinal force $f_{xr\_r}$ from the individual-wheel longitudinal-force calculation unit 1*h*, and the front-left-wheel requested lateral force $F_{yf\_l\_FF}$, the front-right-wheel requested lateral force $F_{yf\_r\_FF}$, the rear-left-wheel requested lateral force $F_{yr\_l\_FF}$, and the rear-right-wheel requested lateral force $F_{yr\_r\_FF}$ from the individual-wheel requested-lateral-force calculation unit 1*i*. Further, the individual-wheel requested-resultant-tire-force calculation unit 1*l* calculates a front-left-wheel requested resultant tire force $F\_fl\_FF$, a front-right-wheel requested resultant tire force $F\_fr\_FF$, a rear-left-wheel requested resultant tire force $F\_rl\_FF$, and a rear-right-wheel requested resultant tire force $F\_rr\_FF$ according to the following expressions (48) to (51), and outputs the calculated values to the individual-wheel requested-excessive-tire-force calculation unit 1*n*. That is, the individual-wheel requested-resultant-tire-force calculation unit 1*l* serves as first tire-force estimation means.

$$F\_fl\_FF=(F_{xf\_l}^2+F_{yf\_l\_FF}^2)^{1/2} \quad (48)$$

$$F\_fr\_FF=(F_{xf\_r}^2+F_{yf\_r\_FF}^2)^{1/2} \quad (49)$$

$$F\_rl\_FF=(F_{xr\_l}^2+F_{yr\_l\_FF}^2)^{1/2} \quad (50)$$

$$F\_rr\_FF=(F_{xr\_r}^2+F_{yr\_r\_FF}^2)^{1/2} \quad (51)$$

The individual-wheel resultant-tire-force calculation unit 1*m* receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculation unit 1*h*, and the front-left-wheel lateral force $F_{yf\_l\_FB}$, the front-right-wheel lateral force $F_{yf\_r\_FB}$, the rear-left-wheel lateral force $F_{yr\_l\_FB}$, and the rear-right-wheel lateral force $F_{yr\_r\_FB}$ from the individual-wheel lateral-force calculation unit 1*j*. The individual-wheel resultant-tire-force calculation unit 1*m* calculates a front-left-wheel resultant tire force $F\_fl\_FB$, a front-right-wheel resultant tire force $F\_fr\_FB$, a rear-left-wheel resultant tire force $F\_rl\_FB$, and a rear-right-wheel resultant tire force $F\_rr\_FB$ according to the following expressions (52) to (55), and outputs the calculated values to the individual-wheel excessive-tire-force calculation unit 1*o*. That is, the individual-wheel resultant-tire-force calculation unit 1*m* serves as second tire-force estimation means.

$$F\_fl\_FB=(F_{xf\_l}^2+F_{yf\_l\_FB}^2)^{1/2} \quad (52)$$

$$F\_fr\_FB=(F_{xf\_r}^2+F_{yf\_r\_FB}^2)^{1/2} \quad (53)$$

$$F\_rl\_FB=(F_{xr\_l}^2+F_{yr\_l\_FB}^2)^{1/2} \quad (54)$$

$$F\_rr\_FB=(F_{xr\_r}^2+F_{yr\_r\_FB}^2)^{1/2} \quad (55)$$

The individual-wheel requested-excessive-tire-force calculation unit 1*n* receives the front-left-wheel friction-circle limit value $\mu\_F_{zfl}$, the front-right-wheel friction-circle limit value $\mu\_F_{zfr}$, the rear-left-wheel friction-circle limit value $\mu\_F_{zrl}$, and the rear-right-wheel friction-circle limit value $\mu\_F_{zrr}$ from the individual-wheel friction-circle limit-value calculation unit 1*k*, and receives the front-left-wheel requested resultant tire force $F\_fl\_FF$, the front-right-wheel requested resultant tire force $F\_fr\_FF$, the rear-left-wheel requested resultant tire force $F\_rl\_FF$, and the rear-right-wheel resultant tire force $F\_rr\_FF$ from the individual-wheel requested-resultant-tire-force calculation unit 1*l*. Further, the individual-wheel requested-excessive-tire-force calculation unit 1*n* calculates a front-left-wheel requested excessive tire force $\Delta F\_fl\_FF$, a front-right-wheel requested excessive tire force $\Delta F\_fr\_FF$, a rear-left-wheel requested excessive tire force $\Delta F\_rl\_FF$, and a rear-right-wheel requested excessive tire force $\Delta F\_rr\_FF$ according to the following expressions (56) to (59), and outputs the calculated values to the excessive-tire-force calculation unit 1*p*. That is, the individual-wheel requested-excessive-tire-force calculation unit 1*n* serves as first excessive-tire-force estimation means.

$$\Delta F\_fl\_FF=F\_fl\_FF-\mu\_F_{zfl} \quad (56)$$

$$\Delta F\_fr\_FF=F\_fr\_FF-\mu\_F_{zfr} \quad (57)$$

$$\Delta F\_rl\_FF=F\_rl\_FF-\mu\_F_{zrl} \quad (58)$$

$$\Delta F\_rr\_FF=F\_rr\_FF-\mu\_F_{zrr} \quad (59)$$

The individual-wheel excessive-tire-force calculation unit 1o receives the front-left-wheel friction-circle limit value $\mu\_F_{zfl}$, the front-right-wheel friction-circle limit value $\mu\_F_{zfr}$, the rear-left-wheel friction-circle limit value $\mu\_F_{zrl}$, the rear-right-wheel friction-circle limit value $\mu\_F_{zrr}$ from the individual-wheel friction-circle limit-value calculation unit 1k, and receives the front-left-wheel resultant tire force $F\_{fl}\_{FB}$, the front-right-wheel resultant tire force $F\_{fr}\_{FB}$, the rear-left-wheel resultant tire force $F\_{rl}\_{FB}$, and the rear-right-wheel resultant tire force $F\_{rr}\_{FB}$ from the individual-wheel resultant-tire-force calculation unit 1m. Further, the individual-wheel excessive-tire-force calculation unit 1o calculates a front-left-wheel excessive tire force $\Delta F\_{fl}\_{FB}$, a front-right-wheel excessive tire force $\Delta F\_{fr}\_{FB}$, a rear-left-wheel excessive tire force $\Delta F\_{rl}\_{FB}$, and a rear-right-wheel excessive tire force $\Delta F\_{rr}\_{FB}$ according to the following expressions (60) to (63), and outputs the calculated values to the excessive-tire-force calculation unit 1p. That is, the individual-wheel excessive-tire-force calculation unit 1o serves as second excessive-tire-force estimation means.

$$\Delta F\_{fl}\_{FB} = F\_{fl}\_{FB} - \mu\_F_{zfl} \qquad (60)$$

$$\Delta F\_{fr}\_{FB} = F\_{fr}\_{FB} - \mu\_F_{zfr} \qquad (61)$$

$$\Delta F\_{rl}\_{FB} = F\_{rl}\_{FB} - \mu\_F_{zrl} \qquad (62)$$

$$\Delta F\_{rr}\_{FB} = F\_{rr}\_{FB} - \mu\_F_{zrr} \qquad (63)$$

The excessive-tire-force calculation unit 1p receives the front-left-wheel requested excessive tire force $\Delta F\_{fl}\_{FF}$, the front-right-wheel requested excessive tire force $\Delta F\_{fr}\_{FF}$, the rear-left-wheel requested excessive tire force $\Delta F\_{rl}\_{FF}$, and the rear-right-wheel requested excessive tire force $\Delta F\_{rr}\_{FF}$ from the individual-wheel requested-excessive-tire-force calculation unit 1n, and receives the front-left-wheel excessive tire force $\Delta F\_{fl}\_{FB}$, the front-right-wheel excessive tire force $\Delta F\_{fr}\_{FB}$, the rear-left-wheel excessive tire force $\Delta F\_{rl}\_{FB}$, and the rear-right-wheel excessive tire force $\Delta F\_{rr}\_{FB}$ from the individual-wheel excessive-tire-force calculation unit 1o. Further, the excessive-tire-force calculation unit 1p compares the sum of the requested excessive tire forces $\Delta F\_{fl}\_{FF}$, $\Delta F\_{fr}\_{FF}$, $\Delta F\_{rl}\_{FF}$ and $\Delta F\_{rr}\_{FF}$ of the wheels with the sum of the excessive tire forces $\Delta F\_{fl}\_{FB}$, $\Delta F\_{fr}\_{FB}$, $\Delta F\_{rl}\_{FB}$ and $\Delta F\_{rr}\_{FB}$ of the wheels, and sets the larger one of the sums as an excessive tire force $F_{over}$. That is, the excessive tire force $F_{over}$ is given by the following expression (64):

$$F_{over} = \mathrm{MAX}((\Delta F\_{fl}\_{FF} + \Delta F\_{fr}\_{FF} + \Delta F\_{rl}\_{FF} + \Delta F\_{rr}\_{FF}), (\Delta F\_{fl}\_{FB} + \Delta F\_{fr}\_{FB} + \Delta F\_{rl}\_{FB} + \Delta F\_{rr}\_{FB})) \qquad (64)$$

The over-torque calculation unit 1q receives the engine speed $N_e$ from the engine-speed sensor 12, the main transmission gear ratio i and the turbine speed $N_t$ of the torque converter from the transmission control unit 14, and the excessive tire force $F_{over}$ from the excessive-tire-force calculation unit 1p. Further, the over-torque calculation unit 1q calculates an over-torque $T_{over}$ according to the following expression (65), and outputs the over-torque $T_{over}$ to the control-amount calculation unit 1r:

$$T_{over} = F_{over} \cdot R_t / i / \eta / i_f \qquad (65)$$

The control-amount calculation unit 1r receives the requested engine torque $T_{drv}$ from the requested-engine-torque calculation unit 1b, and receives the over torque $T_{over}$ from the over-torque calculation unit 1q. Further, the control-amount calculation unit 1r calculates a control amount $T_{req}$ according to the following expression (66), and outputs the control amount $T_{req}$ to the control-amount correction unit 1t:

$$T_{req} = T_{drv} - T_{over} \qquad (66)$$

In this embodiment, the excessive-tire-force calculation unit 1p, the over-torque calculation unit 1q and the control-amount calculation unit 1r constitute control-amount setting means in this way.

Figure 11:
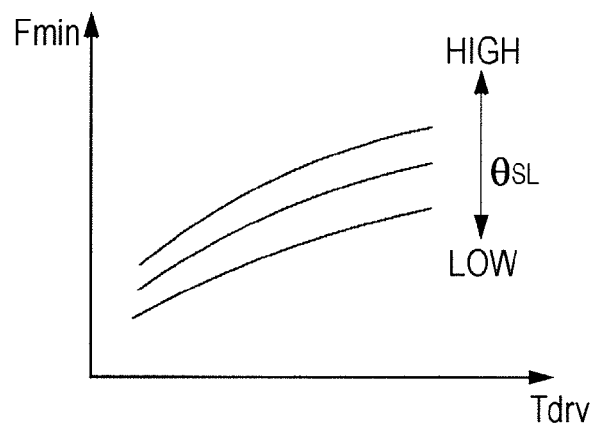
FIG. 11 is an explanatory view showing an example of a characteristic of the minimum driving force based on the requested engine torque and the road surface slope in the embodiment.

The lower-limit calculation unit 1s receives the engine rotation speed $N_e$ from the engine-speed sensor 12, the main transmission gear ratio i and the turbine speed $N_t$ of the torque converter from the transmission control unit 14, a road-surface slope $\theta_{SL}$ from the inclination-angle sensor 20 and the requested engine torque $T_{drv}$ from the requested-engine-torque calculation unit 1b. Further, on the basis of the road-surface slope $\theta_{SL}$ and the requested engine torque $T_{drv}$, the lower-limit calculation unit 1s sets the minimum driving force $F_{min}$ with reference to a map of the minimum driving force $F_{min}$ preset by an experiment or calculation (e.g., a map shown in FIG. 11) with interpolative calculation. In the map of the minimum driving force $F_{min}$ shown in FIG. 11, the minimum driving force $F_{min}$ is set to increase as the road-surface slope $\theta_{SL}$ increases. Thus, the minimum driving force $F_{min}$ is set so as not to interfere with uphill driving on a slope or the like. Further, the minimum driving force $F_{min}$ is set to increase as the requested engine torque $T_{drv}$ increases. Hence, when the driver needs a large driving torque, the minimum driving force $F_{min}$ is set at a large value so that the driver does not feel discomfort. Since the minimum driving force $F_{min}$ is set on the basis of the road-surface slope $\theta_{SL}$ and the requested engine torque $T_{drv}$, it can be easily adopted even when the accelerator-engine torque characteristic changes. This allows good driving with the same operating feeling.

On the basis of the minimum driving force $F_{min}$ thus set, the lower-limit calculation unit 1s calculates the minimum driving torque $T_{min}$ according to the following expression (67), and outputs the minimum driving torque $T_{min}$ to the control-amount correction unit 1t:

$$T_{min} = F_{min}/(i \cdot i_f \cdot t) \cdot R_t \qquad (67)$$

In the expression (67), the term $(i \cdot i_f \cdot t)$ corresponds to the total gear ratio of the vehicle. Therefore, even when the transmission gear is shifted and the main transmission gear ratio i is changed, the minimum driving force $F_{min}$ does not change, and the minimum driving torque $T_{min}$ is set while properly ensuring the necessary minimum driving force $F_{min}$.

The control-amount correction unit 1t receives the control amount $T_{req}$ from the control-amount calculation unit 1r and the minimum driving torque $T_{min}$ from the lower-limit calculation unit 1s. The control-amount correction unit 1t subjects the control amount $T_{req}$ to lower-limit correction using the minimum driving torque $T_{min}$ (sets the control amount $T_{req}$ more than or equal to the minimum driving torque $T_{min}$), and outputs the set control amount $T_{req}$ to the engine control device 2. In this embodiment, the lower-limit calculation unit 1s and the control-amount correction unit 1t constitute control-amount correction means.

In the embodiment, in this way, the minimum driving force $F_{min}$ is set with reference to the map of the minimum driving force $F_{min}$ preset by the experiment or calculation with interpolative calculation on the basis of the road-surface slope $\theta_{SL}$ and the requested engine torque $T_{drv}$, the minimum driving torque $T_{min}$ serving as the lower limit is calculated on the basis of the minimum driving force $F_{min}$ and the total gear ratio of the vehicle, and the control amount $T_{req}$ from the control-amount calculation unit 1r is subjected to lower-limit correction using the minimum driving torque $T_{min}$. For this reason, the driving torque requested by the driver is appropriately considered, uphill driving on the slope or the like is not hindered, and the device can be easily adopted even when the acceleration-engine torque characteristic changes. This allows good driving with the same operating feeling, inhibits not only a currently generated excessive driving force, but also an excessive driving force presumably to be generated in the future, and improves driving stability of the vehicle while properly maintaining the grip forces of the wheels.

While the driving torque is used as the control amount in the embodiment, the control amount input to and output from the control-amount calculation unit $1r$ and the control-amount correction unit $1t$ may be output as the driving force to the engine control device $2$.

Figure 3:
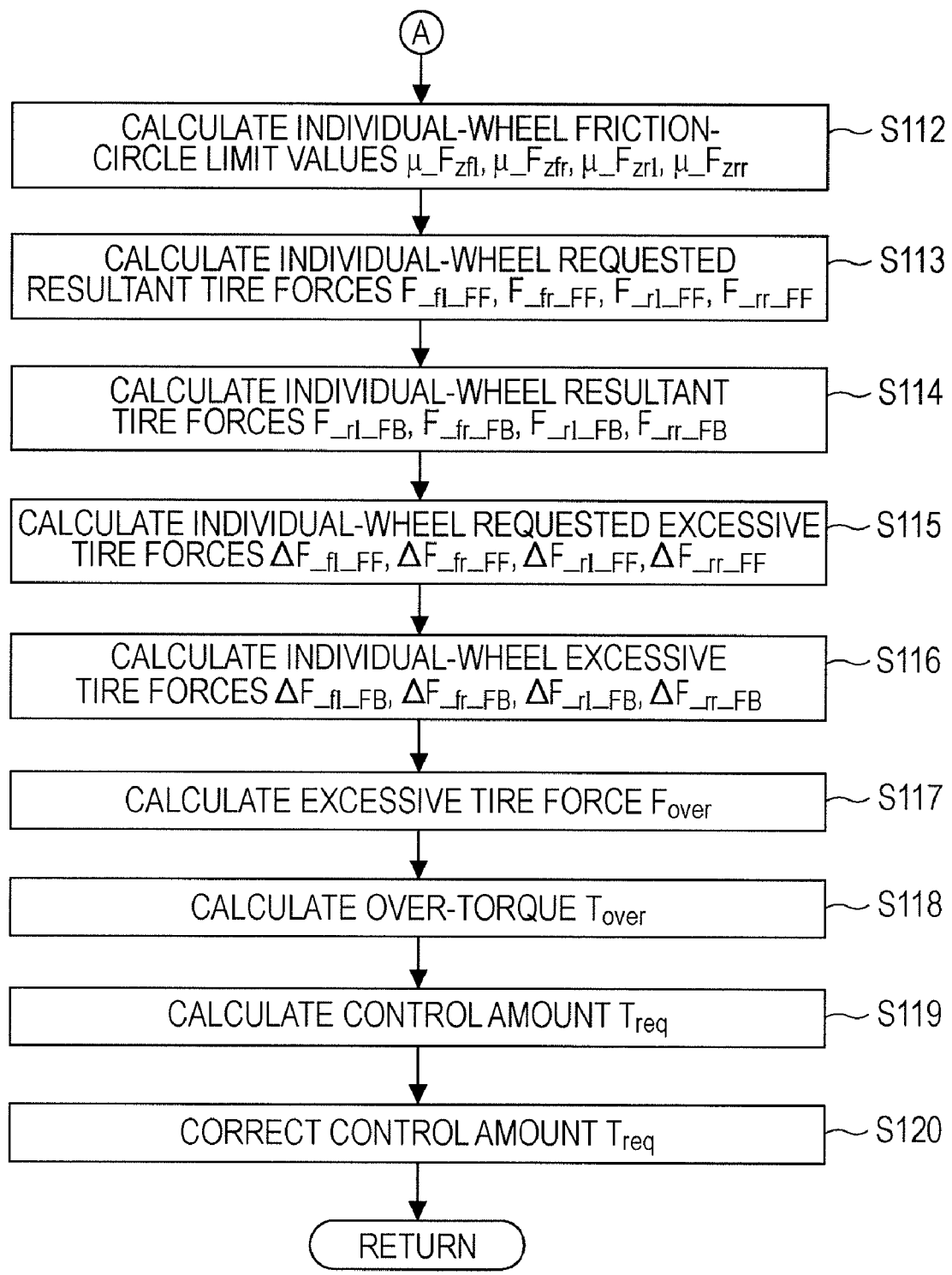
FIG. 3 is a flowchart showing a continuation of the program shown in FIG. 2.

Next, a description will be given of a driving-force control program executed in the above-described driving-force control device $1$, with reference to flowcharts of FIGS. 2 and 3.

First, in S101, necessary parameters, namely, the throttle opening $\theta_{th}$, the engine speed $N_e$, the accelerator opening $\theta_{ACC}$, the main transmission gear ratio i, the turbine speed $N_t$ of the torque converter, the tightening torque $T_{LSD}$ of the differential slip limiting clutch, the lateral acceleration $(d^2y/dt^2)$, the yaw rate $\gamma$, the steering wheel angle $\theta_H$, the wheel speeds $\omega_{fl}$, $\omega_{fr}$, $\omega_{rl}$, and $\omega_{rr}$ of the wheels, and the road-surface friction coefficient $\mu$ are read.

Figure 4:
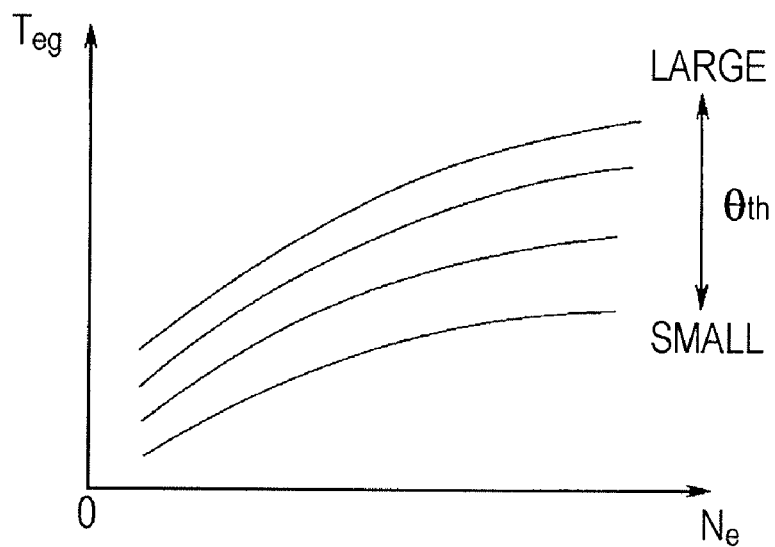
FIG. 4 is an explanatory view showing an example of an engine torque set in accordance with the engine rotation speed and the throttle opening in the embodiment.
Figure 5:
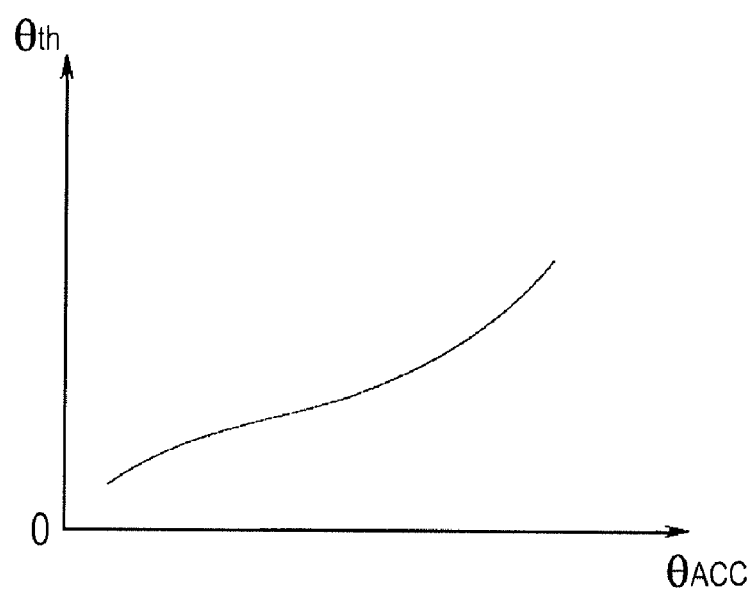
FIG. 5 is an explanatory view showing an example of a relationship between the accelerator opening and the throttle opening for generating the requested engine torque in the embodiment.

Next, in S102, the engine torque calculation unit $1a$ finds the currently generated torque $T_{eg}$ with reference to the map preset in accordance with the engine characteristics (e.g., the map shown in FIG. 4).

In S103, the requested-engine-torque calculation unit $1b$ finds a throttle opening $\theta_{th}$ with reference to the preset map (e.g., the map shown in FIG. 5 referring to the relationship between $\theta_{ACC}$ and $\theta_{th}$), and finds an engine torque $T_{eg}$ from the above-described map shown in FIG. 4 on the basis of the throttle opening $\theta_{th}$.

Next, in S104, the transmission-output-torque calculation unit $1c$ calculates a transmission output torque $T_t$ according to the above-described expression (1).

In S105, the total-driving-force calculation unit $1d$ calculates a total driving force $F_x$ according to the above-described expression (2).

In S106, the front-rear ground-load calculation unit $1e$ calculates a front-wheel ground contact load $F_{zf}$ according to the above-described expression (3), and calculates a rear-wheel ground contact load $F_{zr}$ according to the above-described expression (4).

In S107, the left-wheel load-ratio calculation unit $1f$ calculates a left-wheel load ratio $W_{R\_l}$ according to the above-described expression (5).

In S108, the individual-wheel ground-load calculation unit $1g$ calculates a front-left-wheel ground contact load, $F_{zf\_l}$, a front-right-wheel ground contact load $F_{zf\_r}$, a rear-left-wheel ground contact load $F_{zr\_l}$, and a rear-right-wheel ground contact load $F_{zr\_r}$ according to the above-described expressions (6), (7), (8) and (9).

Next, in S109, the individual-wheel longitudinal-force calculation unit $1h$ calculates a front-left-wheel longitudinal force $F_{xf\_l}$, a front-right-wheel longitudinal force $F_{xf\_r}$, a rear-left-wheel longitudinal force $F_{xr\_l}$, and a rear-right-wheel longitudinal force $F_{xr\_r}$ according to the above-described expressions (19) to (22).

In S110, the individual-wheel requested-lateral-force calculation unit $1i$ calculates a front-left-wheel requested lateral force $F_{yf\_l\_FF}$, a front-right-wheel requested lateral force $F_{yf\_r\_FF}$, a rear-left-wheel requested lateral force $F_{yr\_l\_FF}$, and a rear-right-wheel requested lateral force $F_{yr\_r\_FF}$ according to the above-described expressions (25) to (28).

Next, in S111, the individual-wheel lateral-force calculation unit $1j$ calculates a front-left-wheel lateral force $F_{yf\_l\_FB}$, a front-right-wheel lateral force $F_{yf\_r\_FB}$, a rear-left-wheel lateral force $F_{yr\_l\_FB}$, and a rear-right-wheel lateral force $F_{yr\_r\_FB}$ according to the above-described expressions (40) to (43).

In S112, the individual-wheel friction-circle limit-value calculation unit $1k$ calculates a front-left-wheel friction-circle limit value $\mu\_F_{zfl}$, a front-right-wheel friction-circle limit value $\mu\_F_{zfr}$, a rear-left-wheel friction-circle limit value $\mu\_F_{zrl}$, and a rear-right-wheel friction-circle limit value $\mu\_F_{zrr}$ according to the above-described expressions (44) to (47).

In S113, the individual-wheel requested-resultant-tire-force calculation unit $1l$ calculates a front-left-wheel requested resultant tire force $F\_{fl}\_{FF}$, a front-right-wheel requested resultant tire force $F\_{fr}\_{FF}$, a rear-left-wheel requested resultant tire force $F\_{rl}\_{FF}$, and a rear-right-wheel resultant tire force $F\_{rr}\_{FF}$ according to the above-described expressions (48) to (51).

Next, in S114, the individual-wheel resultant-tire-force calculation unit $1m$ calculates a front-left-wheel resultant tire force $F\_{fl}\_{FB}$, a front-right-wheel resultant tire force $F\_{fr}\_{FB}$, a rear-left-wheel resultant tire force $F\_{rl}\_{FB}$, and a rear-right-wheel resultant tire force $F\_{rr}\_{FB}$ according to the above-described expressions (52) to (55).

In S115, the individual-wheel requested-excessive-tire-force calculation unit $1n$ calculates a front-left-wheel requested excessive tire force $\Delta F\_{fl}\_{FF}$, a front-right-wheel excessive tire force $\Delta F\_{fr}\_{FF}$, a rear-left-wheel requested excessive tire force $\Delta F\_{rl}\_{FF}$, and a rear-right-wheel requested excessive tire force $\Delta F\_{rr}\_{FF}$ according to the above-described expressions (56) to (59).

In S116, the individual-wheel excessive-tire-force calculation unit $1o$ calculates a front-left-wheel excessive tire force $\Delta F\_{fl}\_{FB}$, a front-right-wheel excessive tire force $\Delta F\_{fr}\_{FB}$, a rear-left-wheel excessive tire force $\Delta F\_{rl}\_{FB}$, and a rear-right-wheel excessive tire force $\Delta F\_{rr}\_{FB}$ according to the above-described expressions (60) to (63).

In S117, the excessive-tire-force calculation unit $1p$ calculates an excessive tire force $F_{over}$ according to the above-described expression (64).

In S118, the over-torque calculation unit $1q$ calculates an over-torque $T_{over}$ according to the above-described expression (65), and in S119, the control-amount calculation unit $1r$ calculates a control amount $T_{req}$ according to the above-described expression (66).

Figure 10:
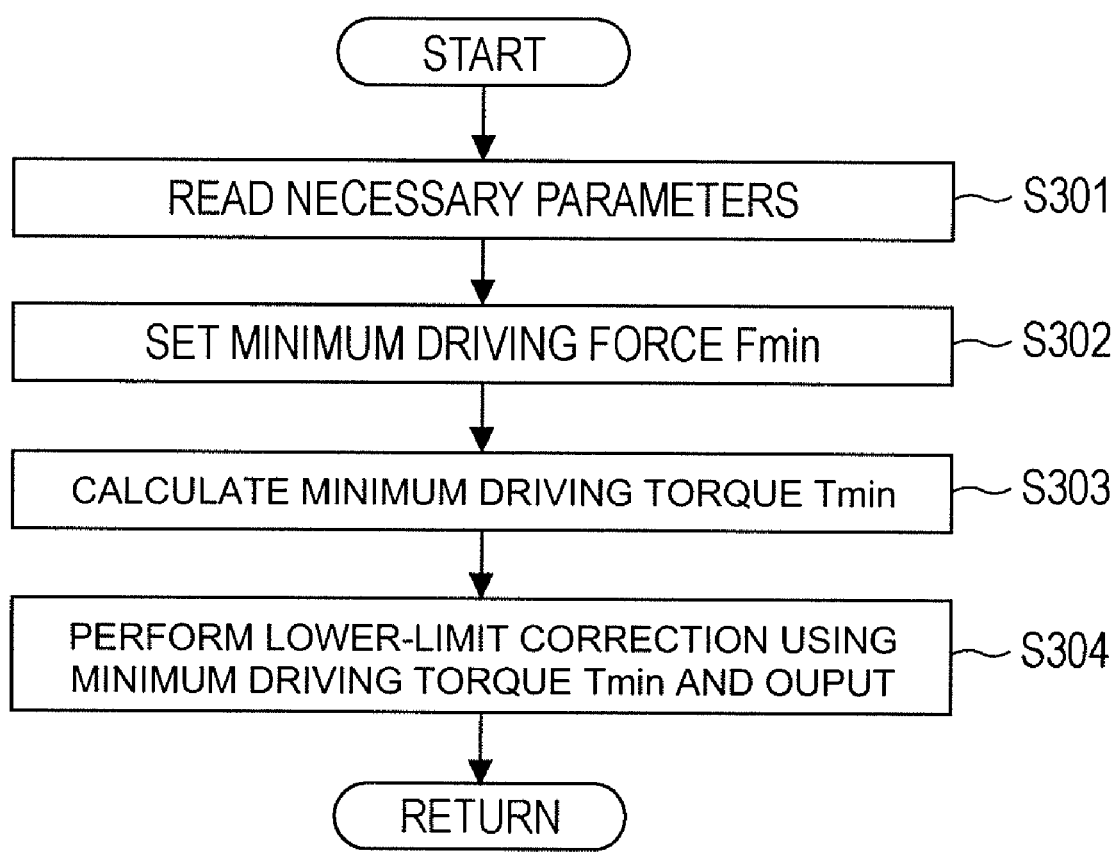
FIG. 10 is a flowchart showing a control-amount correction subroutine of the embodiment.

Next, in S120, a control-amount correction subroutine shown in a flowchart of FIG. 10 is performed.

That is, first, in S301, necessary parameters, namely, the engine speed $N_e$, the main transmission gear ratio i, the turbine speed $N_t$ of the torque converter, the road-surface slope $\theta_{SL}$, the requested engine torque $T_{drv}$, and the control amount $T_{req}$ are read.

In S302, the lower-limit calculation unit $1s$ sets the minimum driving force $F_{min}$ with reference to the map of the minimum driving force $F_{min}$ preset by the experiment or calculation with interpolative calculation, on the basis of the road-surface slope $\theta_{SL}$ and the requested engine torque $T_{drv}$.

In S303, the lower-limit calculation unit $1s$ calculates the minimum driving torque $T_{min}$ according to the above-described expression (67).

Next, in S304, the control-amount correction unit $1t$ subjects the control amount $T_{req}$ to lower-limit correction using the minimum driving torque $T_{min}$ (sets the control amount $T_{req}$ more than or equal to the minimum driving torque $T_{min}$), and outputs the corrected control amount $T_{req}$ to the engine control device 2, so that the routine is exited.

In this way, according to the embodiment of the present invention, the torque value by which the tire force generated in the wheels at the driver's request exceeds the friction-circle limit value is compared with the torque value by which the tire force currently generated on the wheels exceeds the friction-circle limit value, and the larger one of the torque values is subtracted from the driving force requested by the driver. For this reason, an over-torque state is properly corrected not only in the present, but also in the future, whereby spinning and plowing are properly controlled, and the grip forces of the wheels are properly maintained. This improves the driving stability of the vehicle.

Figure 12:
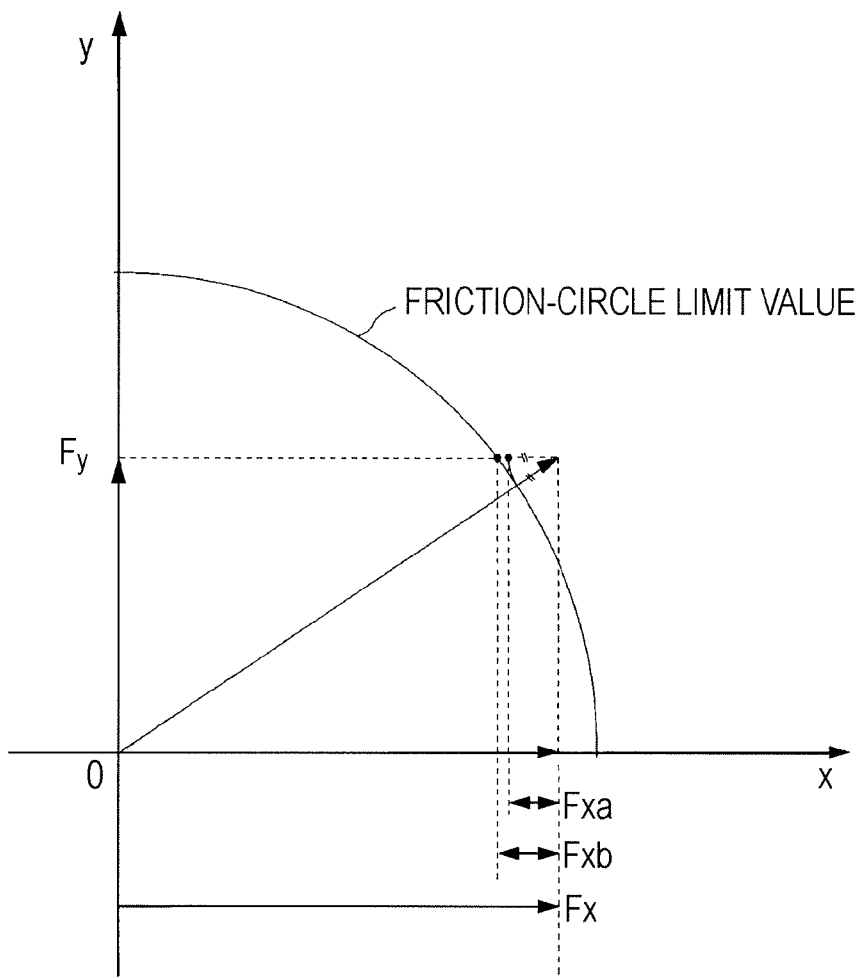
FIG. 12 is an explanatory view showing the excessive tire force to be inhibited in the embodiment.

Since the correction value to be subtracted from the driving force requested by the driver is simply a torque value by which the tire force exceeds the friction-circle limit value, a sudden reduction of the driving force in the longitudinal direction is avoided, and the driver will not feel awkward or feel dissatisfaction due to insufficient acceleration (that is, the driving force is reduced by $F_{xa}$ in FIG. 12).

The grip forces of the tires may be maintained by reliably suppressing the driving force in the longitudinal direction (that is, the driving force may be suppressed by $F_{xb}$ in FIG. 12). In this case, control can be realized by adding signal lines shown by broken lines in FIG. 1 and changing the calculations in the individual-wheel requested-excessive-tire-force calculation unit $1n$ and the individual-wheel excessive-tire-force calculation unit $1o$ as follows:

The individual-wheel requested-excessive-tire-force calculation unit $1n$ receives the front-left-wheel friction-circle limit value $\mu\_F_{zfl}$, the front-right-wheel friction-circle limit value $\mu\_F_{zfr}$, the rear-left-wheel friction-circle limit value $\mu\_F_{zrl}$, and the rear-right-wheel friction-circle limit value $\mu\_F_{zrr}$ from the individual-wheel friction-circle limit-value calculation unit $1k$, receives the front-left-wheel requested lateral force $F_{yf\_l\_FF}$, the front-right-wheel requested lateral force $F_{yf\_r\_FF}$, the rear-left-wheel requested lateral force $F_{yr\_l\_FF}$, and the rear-right-wheel requested lateral force $F_{yr\_r\_FF}$ from the individual-wheel requested-lateral-force calculation unit $1i$, and receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculation unit $1h$.

Further, the individual-wheel requested-excessive-tire-force calculation unit $1n$ calculates a front-left-wheel requested excessive tire force $\Delta F\_fl\_FF$, the front-right-wheel requested excessive tire force $\Delta F\_fr\_FF$, the rear-left-wheel requested excessive tire force $\Delta F\_rl\_FF$, and the rear-right-wheel requested excessive tire force $\Delta F\_rr\_FF$ according to the following expressions (68) to (71), and outputs the calculated values to the excessive-tire-force calculation unit $1p$:

$$\Delta F\_fl\_FF = F_{xf\_l} - (\mu\_F_{zfl}^2 - F_{yf\_l\_FF}^2)^{1/2} \quad (68)$$

$$\Delta F\_fr\_FF = F_{xf\_r} - (\mu\_F_{zfr}^2 - F_{yf\_r\_FF}^2)^{1/2} \quad (69)$$

$$\Delta F\_rl\_FF = F_{xr\_l} - (\mu\_F_{zrl}^2 - F_{yr\_l\_FF}^2)^{1/2} \quad (70)$$

$$\Delta F\_rr\_FF = F_{xr\_r} - (\mu\_F_{zrr}^2 - F_{yr\_r\_FF}^2)^{1/2} \quad (71)$$

The individual-wheel excessive-tire-force calculation unit $1o$ receives the front-left-wheel friction-circle limit value $\mu\_F_{zfl}$, the front-right-wheel friction-circle limit value $\mu\_F_{zfr}$, the rear-left-wheel friction-circle limit value $\mu\_F_{zrl}$, and the rear-right-wheel friction-circle limit value $\mu\_F_{zrr}$ from the individual-wheel friction-circle limit-value calculation unit $1k$, receives the front-left-wheel lateral force $F_{yf\_l\_FB}$, the front-right-wheel lateral force $F_{yf\_r\_FB}$, the rear-left-wheel lateral force $F_{yr\_l\_FB}$, and the rear-right-wheel lateral force $F_{yr\_r\_FB}$ from the individual-wheel lateral-force calculation unit $1j$, and receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculation unit $1h$.

Further, the individual-wheel excessive-tire-force calculation unit $1o$ calculates a front-left-wheel excessive tire force $\Delta F\_fl\_FB$, a front-right-wheel excessive tire force $\Delta F\_fr\_FB$, a rear-left-wheel excessive tire force $\Delta F\_rl\_FB$, and a rear-right-wheel excessive tire force $\Delta F\_rr\_FB$ according to the following expressions (72) to (75), and outputs the calculated values to the excessive-tire-force calculation unit $1p$:

$$\Delta F\_fl\_FB = F_{xf\_l} - (\mu\_F_{zfl}^2 - F_{yf\_l\_FB}^2)^{1/2} \quad (72)$$

$$\Delta F\_fr\_FB = F_{xf\_r} - (\mu\_F_{zfr}^2 - F_{yf\_r\_FB}^2)^{1/2} \quad (73)$$

$$\Delta F\_rl\_FB = F_{xr\_l} - (\mu\_F_{zrl}^2 - F_{yr\_l\_FB}^2)^{1/2} \quad (74)$$

$$\Delta F\_rr\_FB = F_{xr\_r} - (\mu\_F_{zrr}^2 - F_{yr\_r\_FB}^2)^{1/2} \quad (75)$$

What is claimed is:

1. A vehicle driving-force control device comprising:
   first-tire-force estimation means configured to estimate, as a first tire force, a tire force to be generated on a wheel of a vehicle on the basis of a request from a driver;
   second-tire-force estimation means configured to estimate a tire force currently being generated on the wheel as a second tire force;
   friction-circle limit-value setting means configured to set a friction-circle limit value of a tire force;
   first-excessive-tire-force estimation means configured to estimate, as a first excessive tire force, a tire force exceeding the friction-circle limit value on the basis of the first tire force and the friction-circle limit value;
   second-excessive-tire-force estimation means configured to estimate, as a second excessive tire force, a tire force exceeding the friction-circle limit value on the basis of the second tire force and the friction-circle limit value;
   control-amount setting means configured to set a control amount of at least one of a driving force and a driving torque for driving the vehicle on the basis of the first excessive tire force and the second excessive tire force;
   road-surface-slope detection means configured to detect a road surface slope of a driving road;
   driver-requested engine-torque calculation means configured to calculate an engine torque requested by the driver as a driver-requested engine torque; and
   control-amount correction means configured to set a lower limit of the control amount on the basis of the road surface slope of the driving road and the driver-requested engine torque so as to perform lower-limit correction of the control amount.

2. The vehicle driving-force control device according to claim 1,
   wherein the control amount set by the control-amount setting means is the driving torque, and
   wherein the control-amount correction means sets the minimum driving force on the basis of the road-surface slope of the driving road and the driver-requested engine torque, and calculates the minimum driving torque serving as the lower limit on the basis of the set minimum driving force and a total gear ratio of the vehicle so as to perform the lower-limit correction of the control amount.

3. The vehicle driving-force control device according to claim 1, wherein the driver-requested engine-torque calculation means calculates the driver-requested engine torque on the basis of an accelerator opening and an engine speed.

4. The vehicle driving-force control device according to claim 1, wherein the control-amount setting means compares the first excessive tire force with the second excessive tire force, and sets the control amount by subtracting the larger one of the first and second excessive tire forces from the driver-requested engine torque.

5. The vehicle driving-force control device according to claim 1, further comprising lower-limit calculation means configured to set a minimum driving force on the basis of the road surface slope of the driving road and the driver-requested engine torque.

6. The vehicle driving-force control device according to claim 5, wherein the lower-limit calculation means is configured to set an increased minimum driving force based on an increased driver-requested engine torque, independently of any increase in the road surface slope of the driving road.

7. A vehicle driving-force control device comprising:
a first-tire-force estimation unit configured to estimate, as a first tire force, a tire force to be generated on a wheel of a vehicle on the basis of a request from a driver;
a second-tire-force estimation unit configured to estimate a tire force currently being generated on the wheel as a second tire force;
a friction-circle limit-value setting unit configured to set a friction-circle limit value of a tire force;
a first-excessive-tire-force estimation unit configured to estimate, as a first excessive tire force, a tire force exceeding the friction-circle limit value on the basis of the first tire force and the friction-circle limit value;
a second-excessive-tire-force estimation unit configured to estimate, as a second excessive tire force, a tire force exceeding the friction-circle limit value on the basis of the second tire force and the friction-circle limit value;
a control-amount setting unit configured to set a control amount of at least one of a driving force and a driving torque for driving the vehicle on the basis of the first excessive tire force and the second excessive tire force;
a driver-requested engine-torque calculation unit configured to calculate an engine torque requested by the driver as a driver-requested engine torque; and
a control-amount correction unit configured to set a lower limit of the control amount on the basis of a determined road surface slope of the driving road and the driver-requested engine torque so as to perform lower-limit correction of the control amount.

8. The vehicle driving-force control device according to claim 7,
wherein the control amount set by the control-amount setting unit is the driving torque, and
wherein the control-amount correction unit sets the minimum driving force on the basis of the determined road-surface slope of the driving road and the driver-requested engine torque, and calculates the minimum driving torque serving as the lower limit on the basis of the set minimum driving force and a total gear ratio of the vehicle so as to perform the lower-limit correction of the control amount.

9. The vehicle driving-force control device according to claim 7, wherein the driver-requested engine-torque calculation unit calculates the driver-requested engine torque on the basis of an accelerator opening and an engine speed.

10. The vehicle driving-force control device according to claim 7, wherein the control-amount setting unit compares the first excessive tire force with the second excessive tire force, and sets the control amount by subtracting the larger one of the first and second excessive tire forces from the driver-requested engine torque.

11. The vehicle driving-force control device according to claim 7, further comprising a lower-limit calculation unit configured to set a minimum driving force on the basis of the determined road surface slope of the driving road and the driver-requested engine torque.

12. The vehicle driving-force control device according to claim 11, wherein the lower-limit calculation unit is configured to set an increased minimum driving force based on an increased driver-requested engine torque, independently of any increase in the determined road surface slope of the driving road.

* * * * *